US012794894B2

(12) United States Patent
Einhorn-Cohen et al.

(10) Patent No.: US 12,794,894 B2
(45) Date of Patent: Nov. 10, 2026

(54) SYSTEM AND METHOD FOR AUTOMATED IMPROVED SYSTEM SECURITY

(71) Applicant: Actimize Ltd., Ra'anana (IL)

(72) Inventors: Michal Einhorn-Cohen, Rosh Haayin (IL); Ofir Yakobi, Hod Hasharon (IL); Danny Butvinik, Haifa (IL)

(73) Assignee: Actimize Ltd. (IL)

( * ) Notice: Subject to any disclaimer, the term of this patent is extended or adjusted under 35 U.S.C. 154(b) by 72 days.

(21) Appl. No.: 19/007,943

(22) Filed: Jan. 2, 2025

(65) Prior Publication Data

US 2026/0189564 A1 Jul. 2, 2026

(51) Int. Cl.
*H04L 9/40* (2022.01)

(52) U.S. Cl.
CPC .................................. *H04L 63/101* (2013.01)

(58) Field of Classification Search
CPC ..................................................... H04L 63/101
USPC .......................................................... 709/225
See application file for complete search history.

(56) References Cited

U.S. PATENT DOCUMENTS

2020/0067861 A1* 2/2020 Leddy ................. G06F 21/6245
2024/0070230 A1* 2/2024 Bui .................... G06Q 30/0185
2025/0259082 A1* 8/2025 Crabtree ................ G06N 3/042
2025/0265255 A1* 8/2025 Jia .......................... G06Q 40/02
2025/0328319 A1* 10/2025 Upadhyay ................. G06F 8/35

FOREIGN PATENT DOCUMENTS

EP 4054145 A1 * 9/2022 ........... H04L 9/3213

OTHER PUBLICATIONS

Zhao et al., "Optimizing Supply Chain Risk Management: An Integrated Framework Leveraging Large Language Models", 2024 (Year: 2024).*

* cited by examiner

*Primary Examiner* — Moustafa M Meky
*Assistant Examiner* — Kidest Mendaye

(57) ABSTRACT

Systems and methods are provided for automatically creating and using a watch list using generative artificial intelligence. The systems and methods can include determining variants for a watch list of entities that are not allowed access to a senders computing system, and determining a similarity between the variants and the watch list to, e.g., determine which variants to add to the watch list. The systems and methods can include updating the watch list and transmitting back to the sender computers.

17 Claims, 4 Drawing Sheets

SYSTEM AND METHOD FOR AUTOMATED IMPROVED SYSTEM SECURITY

TECHNICAL FIELD OF THE INVENTION

The present invention relates generally to improving security in computing systems. In particular, to improving watch list filters and entity matching utilizing generative artificial intelligence labelled data.

BACKGROUND OF THE INVENTION

Current computing systems (e.g., systems used for anti-money laundering) can utilize watch lists filters (WLF) detection for identifying sanctioned individuals, companies and/or countries to avoid impermissible access. In the field of anti-money laundering, screening customer data using watch list filters can identify and prevent money laundering and/or terrorism financing.

One difficulty in current systems utilizing WLF can be accuracy (e.g., false positives and false negatives) due to variations in names (e.g., Jon Smith vs. Jonathan Smith). Even human experts often struggle to verify matches due to subtle difference and a necessity to discern whether entities are indeed the same. An inability to verify matches can restrict a real-time implementation and in some systems immediate access may be required. For example, to determine if a person can open a bank account under potential sanction regulations.

Current systems utilizing WLF can involve name-matching technology that rely on rule-based methods that rely on predefined rules and/or algorithms for exact or fuzzy matching, which can cause lower accuracy due to, for example, challenges in handling name variations, misspellings, and/or cultural differences. Current system utilizing rule-based methods often struggle with ambiguity, and fuzzy matching can introduce errors when names are close but not identical. Additionally, these methods may have difficulty adapting to new or unseen data, leading to inconsistent results, for example, Robert and Bob are very different when comparing strings.

Therefore, it can be desirable to provide a high accuracy rapid processing to support real-time processing of WLF.

SUMMARY OF THE INVENTION

Improvements and advantages of embodiments of the invention may include improved accuracy, real-time operation, and/or improved model training. Advantages can also include by using a generative-AI model which relies on the semantic, syntactic, and contextual human-like understanding of the model, rich and high-quality data can be produced.

In one aspect, the invention involves a computerized-method for automatically creating and using a watch list using generative artificial intelligence. The computerized-method can involve receiving, by a computer, a watch list comprising a plurality of entities that are not allowed access to a senders computing system, wherein the plurality of entities in the watchlist are strings. The computerized-method can involve determining, by the computer, a plurality of variants for the plurality of entities using a machine learning model, wherein the plurality of variants are strings. The computerized-method can involve determining, by the computer, a first embedded array based on the watchlist, wherein the first embedded array are numerical values. The computerized-method can involve determining by the computer, a second embedded array based on the plurality of variants, wherein the second embedded array are numerical values. The computerized-method can involve adding, by the computer, all of the plurality of variants that have similarity with at least one watch list entities above a predetermined threshold to the watch list. The computerized-method can involve transmitting, by the computer, the watch list to the senders computing system such that the sender's watch list is updated.

In some embodiments, the computerized-method can involve receiving, by the computer, a request for access to the senders computing system, the request including an entity, converting, by the computer, the entity to a numerical value, adding, by the computer, the entity to the watch list and restricting access to the senders computing system, if a similarity between the entity and any of the entities in the watch list is above a threshold, and allowing, by the computer, access to the senders computing system, if the similarity is below the threshold.

In some embodiments, the computerized-method can involve determining the first embedded array, the second embedded array, or both, further comprises employing a—gtr-t5-base algorithm.

In some embodiments, the similarity is based on a cosine similarity score. In some embodiments, the plurality of variants are determined using GPT. In some embodiments, the computerized-method can involve each variant of the plurality of variants is in a same pattern as its corresponding entity.

In some embodiments, the plurality of variants are a different ordering, abbreviation, misspelling, different formats, or any combination thereof of the plurality of entities.

In some embodiments, the sender's computing system is a computing system for access to banking.

In another aspect, the invention includes a system for automatically creating and using a watch list using generative artificial intelligence. The system can include a processor configured to receive a watch list comprising a plurality of entities that are not allowed access to a senders computing system, wherein the plurality of entities in the watchlist are strings. The processor can also determine a plurality of variants for the plurality of entities using a machine learning model, wherein the plurality of variants are strings. The processor can also determine a first embedded array based on the watchlist, wherein the first embedded array are numerical values. The processor can also determine a second embedded array based on the plurality of variants, wherein the second embedded array are numerical values. The processor can also add all of the plurality of variants that have similarity with at least one watch list entities above a predetermined threshold to the watch list. The processor can also transmit the watch list to the senders computing system such that the sender's watch list is updated.

In some embodiments, the processor is further configured to receive a request for access to the senders computing system, the request including an entity, convert the entity to a numerical value, add the entity to the watch list and restricting access to the senders computing system, if a similarity between the entity and any of the entities in the watch list is above a threshold, and allow access to the senders computing system, if the similarity is below the threshold.

In some embodiments, determining the first embedded array, the second embedded array, or both, can further include employing a gtr-t5-base algorithm.

In some embodiments, the similarity is based on a cosine similarity score. In some embodiments, the plurality of variants are determined using GPT. In some embodiments, each variant of the plurality of variants is in a same pattern as its corresponding entity.

In some embodiments, the plurality of variants are a different ordering, abbreviation, misspelling, different formats, or any combination thereof of the plurality of entities. In some embodiments, the sender's computing system is a computing system for access to banking.

In another aspect, the invention includes a non-transitory computer program product comprising instructions which, when the program is executed cause the computer to receive a watch list comprising a plurality of entities that are not allowed access to a senders computing system, wherein the plurality of entities in the watchlist are strings. The instructions can also cause the computer to determine a plurality of variants for the plurality of entities using a machine learning model, wherein the plurality of variants are strings. The instructions can also cause the computer to determine a first embedded array based on the watchlist, wherein the first embedded array are numerical values. The instructions can also cause the computer to determine a second embedded array based on the plurality of variants, wherein the second embedded array are numerical values. The instructions can also cause the computer to add all of the plurality of variants that have similarity with at least one watch list entities above a predetermined threshold to the watch list. The instructions can also cause the computer to transmit the watch list to the senders computing system such that the sender's watch list is updated.

In some embodiments, the instructions further cause the computer to receive a request for access to the senders computing system, the request including an entity, convert the entity to a numerical value, add the entity to the watch list and restricting access to the senders computing system, if a similarity between the entity and any of the entities in the watch list is above a threshold, and allow access to the senders computing system, if the similarity is below the threshold.

In some embodiments, determining the first embedded array, the second embedded array, or both, further comprises employing a gtr-t5-base algorithm. In some embodiments, the plurality of variants are determined using GPT.

These, additional, and/or other aspects and/or advantages of the present invention may be set forth in the detailed description which follows; possibly inferable from the detailed description; and/or learnable by practice of the present invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
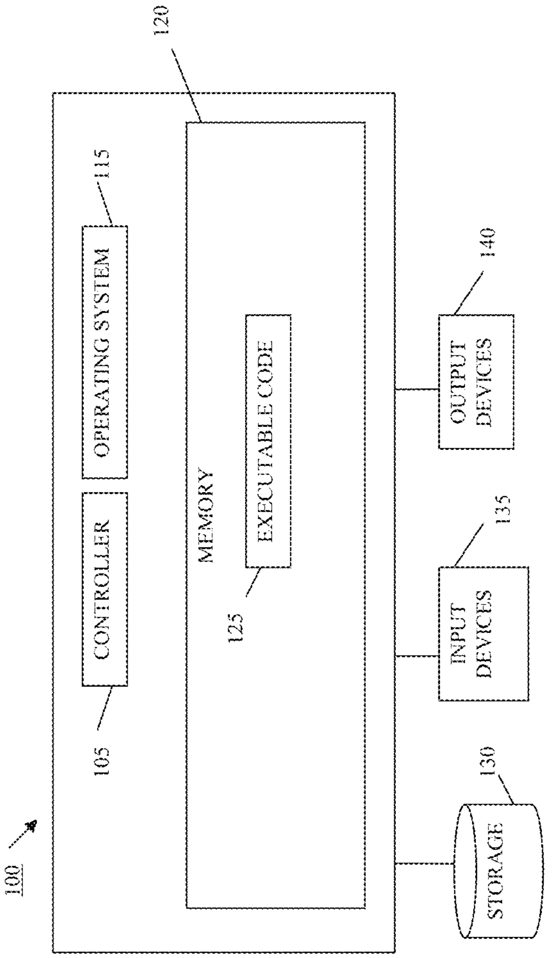
FIG. 1 shows a block diagram of an exemplary computing device which may be used with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

As used herein, "machine learning", "machine learning algorithms", "machine learning models", "ML", or similar, may refer to models built by algorithms in response to/based on input sample or training data. ML models may make predictions or decisions without being explicitly programmed to do so. ML models require training/learning based on the input data, which may take various forms.

ML models may, for example, include Large Language Models (LLM) such as Generative Pre-Trained Transformer (GPT), Bidirectional Encoder Representations from Transformers (BERT), Pathways Language Model (PaLM) and the like, (artificial) neural networks (NN), decision trees, regression analysis, Bayesian networks, Gaussian networks, genetic processes, etc. Additionally or alternatively, ensemble learning methods may be used which may use multiple/modified learning algorithms, for example, to enhance performance. Ensemble methods, may, for example, include "Random forest" methods or "XGBoost" methods.

Neural networks (NN) (or connectionist systems) are computing systems inspired by biological computing systems, but operating using manufactured digital computing technology. NNs are made up of computing units typically called neurons (which are artificial neurons or nodes, as opposed to biological neurons) communicating with each other via connections, links or edges. In common NN implementations, the signal at the link between artificial neurons or nodes can be for example a real number, and the output of each neuron or node can be computed by function of the (typically weighted) sum of its inputs, such as a rectified linear unit (ReLU) function. NN links or edges typically have a weight that adjusts as learning proceeds. The weight increases or decreases the strength of the signal at a connection. Typically, NN neurons or nodes are divided or arranged into layers, where different layers can perform different kinds of transformations on their inputs and can have different patterns of connections with other layers. NN systems can learn to perform tasks by considering example input data, generally without being programmed with any task-specific rules, being presented with the correct output for the data, and self-correcting, or learning.

Various types of NNs exist. For example, a convolutional neural network (CNN) can be a deep, feed-forward network, which includes one or more convolutional layers, fully connected layers, and/or pooling layers. CNNs are particularly useful for visual applications. Other NNs can include for example transformer NNs, useful for speech or natural language applications, and long short-term memory (LSTM) networks.

Typical NNs can require that nodes of one layer depend on the output of a previous layer as their inputs. Current systems typically proceed in a synchronous manner, first typically executing all (or substantially all) of the outputs of a prior layer to feed the outputs as inputs to the next layer. Each layer can be executed on a set of cores synchronously (or substantially synchronously), which can require a large amount of computational power, on the order of 10s or even 100s of Teraflops, or a large set of cores. On modern GPUs this can be done using 4,000-5,000 cores.

It will be understood that any subsequent reference to "machine learning", "machine learning algorithms", "machine learning models", "ML", or similar, may refer to any/all of the above ML examples, as well as any other ML models and methods as may be considered appropriate.

FIG. 1 shows a high-level block diagram of an exemplary computing device which may be used with embodiments of the present invention. Computing device 100 may include a controller or processor 105 that may be, for example, a central processing unit processor (CPU), a chip or any suitable computing or computational device, an operating system 115, a memory 120, a storage 130, input devices 135 and output devices 140 such as a computer display or monitor displaying for example a computer desktop system. Each of modules and equipment and other devices and modules discussed herein, modules and processes in FIG. 2 or 3 may be or include, or may be executed by, a computing device such as included in FIG. 1 although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein, and/or data.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIG. 2 or other figures, or other methods, according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by, for example, executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data may be stored in a storage 130 and may be loaded from storage 130 into a memory 120 where it may be processed by controller 105. In some embodiments, some of the components shown in FIG. 1 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

In general, the invention can involve, for a given agent, determining a root cause of a decrease in performance. The root cause analysis can include automatically identifying a contributing factor (e.g., KPI, metric and/or behavior) that contributes most significantly to the decrease in performance. The automatic identification of the root cause can allow for more accurate results in comparison to a human manager attempting to identify a root cause. The root cause analysis algorithm can produce more accurate results, and insight into the power of a causal relationship between a KPI, and its contributing metrics and behaviors, and/or a contribution of the KPI itself.

Figure 2:
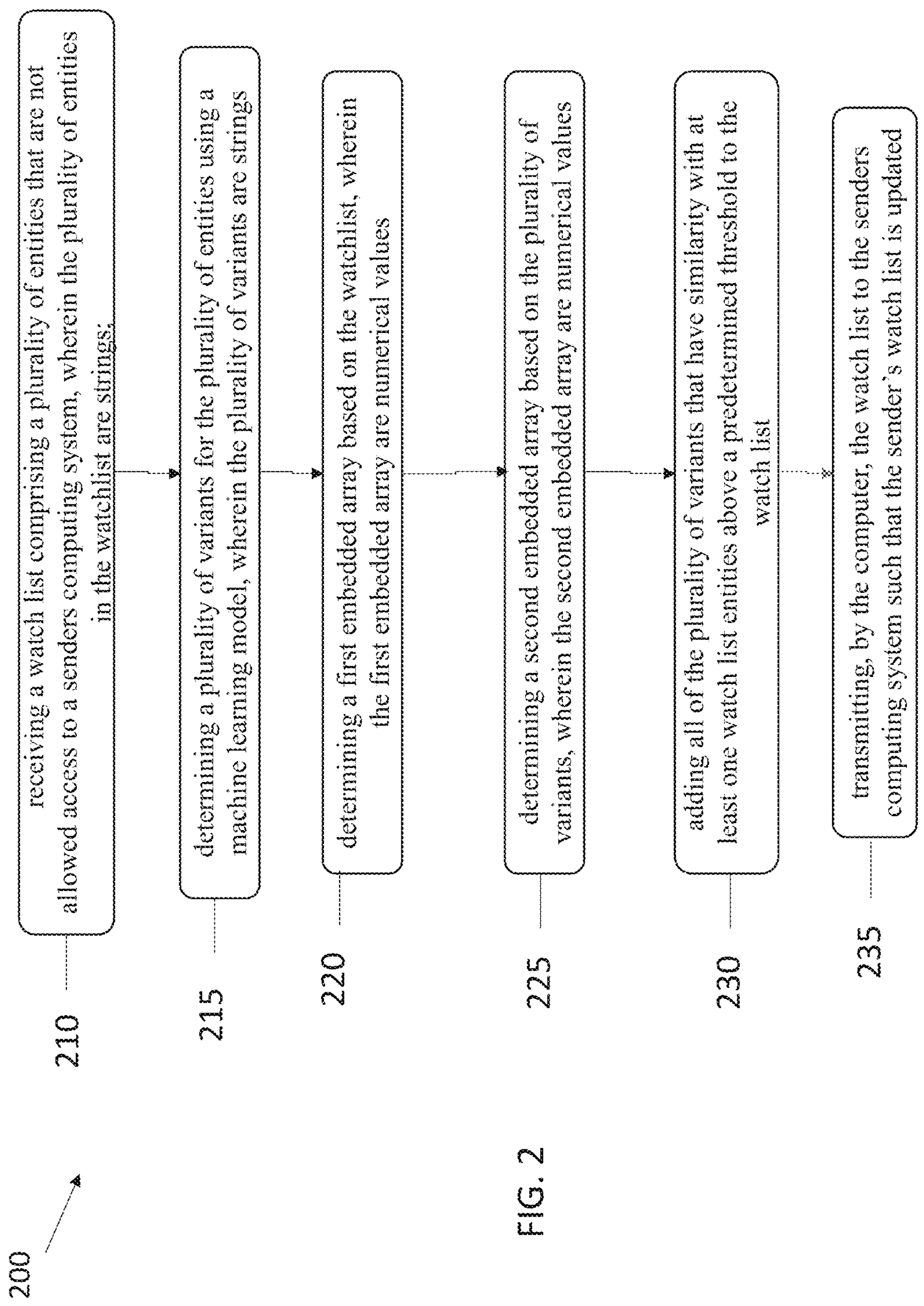
FIG. 2 is flowchart for a method for automatically creating and using a watch list filter using generative artificial intelligence, according to some embodiments of the invention.

FIG. 2 is flowchart 200 for a method for automatically creating and using a watch list filter using generative artificial intelligence, according to some embodiments of the invention.

The method can involve receiving (e.g., by a computer 100 as shown above in FIG. 1) a list of entities (e.g., watch list comprising a plurality of entities) that are not allowed access to a sender's computing system, wherein the plurality of entities in the watchlist are strings (Step 210). For example, a company, government, individual, another computing system can create a watch list filter that they would like implemented. The watch list can include politically exposed persons (PEP), individuals with sanctions, individuals linked to terrorism, individuals involved with FinCrime, individuals with adverse media exposure, or any combination thereof.

An entity can include fields of a name of an organization, an address, an individual's name, a date of birth, an identification number, nationality, country of origin, occupation, industry, contact information, affiliation, and/or sanction list status.

The plurality of entities can be in a pandas DataFrame with one or more columns containing strings.

The method can involve determining a plurality of variants for the plurality of entities using a machine learning model, wherein the plurality of variants are strings (Step 215). The plurality of variants can be based on the watch list filter. For example, for an individual named Jhon Smith the variants John Smith, J. Smith, and Jhonathan Smith can be determined.

The plurality of variants can be determined by using a Generative Pre-trained Transformer (GPT), for example, GPT-4 by OpenAI. The GPT can be trained from general watch lists. (e.g., from publicly available sources such as Office of Foreign Asset Control (OFAC), and/or proprietary watch lists of organizations). The GPT prompt for generating the variants can be dynamic, automatically changed, so that each entity's variants can be determined without having to generate the prompt each time. As is apparent to those of ordinary skill, a large language model (LLM) can be used.

The prompts for generating the variants with the GPT can be based on a type of entity (e.g., individual name, company name), a desired format (e.g., phonetic variations, abbreviated forms), and/or contextual details (e.g., cultural norms). In various embodiments, the prompts are dynamically generated based on predefined rules or templates. For example, an entities attributes (e.g., format, length and/or type) can be used to cause a predefined stored template to be used, and/or rules to be applied to generate a prompt.

The prompt for generating the variants with the GPT can be as follows:

Generate a different variation of the following original entity: {entity name} for entity resolution.

The original entity is represented in the following way: attribute's name ends with a colon, and after the colon starts the attribute's value.

This single variation could include: a) different orderings, b) abbreviations, c) misspellings (only in words that don't end with a colon), and d) different formats (e.g.: different date format if date is available).

This single variation should be in the same pattern of the original entity (i.e.: use only space as attributes separator and same column names).

Do not change the attributes' names at all.

Do not change the type of attribute values from numbers to words (e.g.: do not change 35 to thirty-five).

Do not add coma as separator.

As shown in the prompt, the {entity name} can be automatically populated for each entity. In this manner, the prompt used for each entity to generate the variants can modified without recreating the prompt each time. In some embodiments, the prompts can be generated by automatically iterating through the input data where the relevant entity information is dynamically inserted into the prompt for each entity. This can allow, for example, for variations to be generated without recreating prompts manually for each case.

In some embodiments, other entity fields beside name can be used to generate variants. For example, variants can be determined for date of birth, type of entity (e.g., organization, country and/or individual), middle name, title (e.g., Dr., Prof., Ms, Mr. Miss, Mrs), aliases, and/or nicknames.

Each variant can be returned from the GPT model in a pandas DataFrame that can include: original entities, generated variation, and/or unmatched entities.

The method can involve determining a first embedded array (or embedding vector) based on the watch list, wherein the first embedded array are numerical values (Step 220). The embedded arrays can be generated for each entity. The numerical values can be determined based on a gtr-t5-base algorithm. For example, assume an entity name of an entity on the watch list filter includes an individuals name of "Jhon Smith." Applying the gtr-t5-base algorithm to "Jhon Smith" can result in the first embedded array of 768 dimensions for GTR-T5-Base algorithm. For a plurality of entities, a plurality of embedded arrays can be determined.

In some embodiments, all of the entities in the watch list are converted into numerical values.

In some embodiments, only a portion (e.g., 50% or 75%) of the entities of the watch list are converted into numerical values. For example, a watch list with millions of entities can be sampled as a valid representation of the watch list.

In some embodiments, there can be a screening list. The screening list can be a list of entities who are under monitoring to assess their potential inclusion in the watch list. The screening list can include strings.

The watch list and/or screening list can by converted to embedded arrays as follows:

$$\text{for } s = 1 \text{ to } S \text{ do:}$$

$$V(E_s) = \text{embed}(E_s)$$

where $E_s$ is the entity field and s is a number of entities in the watch list or screening list.

The method can involve determining a second embedded array based on the plurality of variants, wherein the second embedded array are numerical values (Step 225). For example, assume one variant of the plurality of variants includes a variant of "John Smith" that is "J. Smith." Applying the gtr-t5-base algorithm to "J, Smith" can result in the second embedded array of 768 dimensions for GTR-T5-Base algorithm. The GTR-T5-Base algorithm can be advantageous over other algorithms (e.g., BERT transformer) as it is sufficiently fine-tuned for semantic textual similarity tasks, such that further tuning may not be needed.

The method can involve adding all of the plurality of variants that have similarity with at least one watch list entities above a predetermined threshold to the watch list (Step 230). Each of the plurality of variants can be compared to each of the entities on the watch list to determine whether each variant is similar enough to an entity on the watch list that a request for access by an entity with the variant can be considered the same (e.g., valid variant) as if the entity on the watch list made the request.

The similarity can be determined by a cosine similarity score. A similarity threshold can be set (e.g., set by an administrator, input by a user) such that if a variant and an entity have a similarity score above the threshold, they can be viewed as the same (e.g., a valid variant). The similarity score can be a floating point number between −1 and 1, where 1 indicates the highest similarity.

For example, assume an entity on the watch list having the same "Jhon Smith" and assume a plurality of variants of "John Smith," "J. Smith," and "Jhonathan Smith." Each can be converted to an embedded array, as described above. The similarity score between "Jhon Smith" and "John Smith" can be 0.9, between "Jhon Smith" and "J. Smith" can be 0.8, and between "Jhon Smith" and "Jhonathan Smith" can be 0.75. If the similarity threshold is 0.78, then "John Smith" and "J. Smith" are valid variants and "Jhonathan Smith" is not a valid variant. In this example, "John Smith" and "J. Smith" can be added to the watch list and "Jhonathan Smith" is not added to the watch list.

The similarity can be determined as follows:

$$\text{for } s = 1 \text{ to } S \text{ do:}$$
$$\text{for } i = 1 \text{ to } N \text{ do:}$$
$$\text{score}_{si} = sim(V(E_s), V(E_i))$$

where si is an indicator for entry entity, where i is an indicator of watch list entity, where $V(E_s)$ is an embedding array of the entry entity [and $V(E_i)$ is an embedded array of watch list entities Whether to add a variant to the watch list can be determined as follows: for s=1 to S do:

$$\text{for } i = 1 \text{ to } N \text{ do:}$$
$$\text{if score}_{si} \geq \text{threshold}$$
$$\text{restrict } E_S^{(i)}$$
$$\text{add } E_S^{(i)} \text{ to Watch List}$$
$$\text{continue to } E_S^{(i+1)}$$

where s is the indicator value for the entry entity; i is the indicator for the watch list entity; $\text{score}_{si}$ is the similarity score between entry entity $E_s$ and the watch list entity $$E_i; E_S^{(i)}$$

is the entry entity s that was compared with watch list entity $E_i$.

The method can involve transmitting the watch list to the senders computing system such that the sender's watch list is updated (Step 235).

The method can also involve, determining for each entity that requests access to a system, whether the entity can gain access. A request can be received for access to a computing system (e.g., the computing system of an organization that sent the watch list that the variants are generated for). The request can include an entity. A field in the entity (e.g., the field that is used for the watch list) can be converted into numerical values, as described above. The numerical values can be determined via the gtr-5t-base algorithm. A similarity score can be determined between the received entity and the watch list, which includes the plurality of variants. If the similarity is below a threshold, then the entity can be allowed access to the computing system. If the similarity is not below the threshold, then the entity (e.g., via the entity field) is in the watch list and access denied. In this manner, the entities making requests that have fields that are semantically different than the original watch list but should still be denied entry can be properly excluded.

In some embodiments an alert is transmitted to the computing system when access is denied. In some embodiments, if a user is opening an on-line bank account, an alert message can be transmitted to cause the account not to be opened.

In some embodiments, multiple watch list fields can be used. For example, name and date of birth can be used. In these embodiments, variants for each field can be determined, similarity determined for each field, and then similarity for the variants can be determined based on the field.

Figure 3:
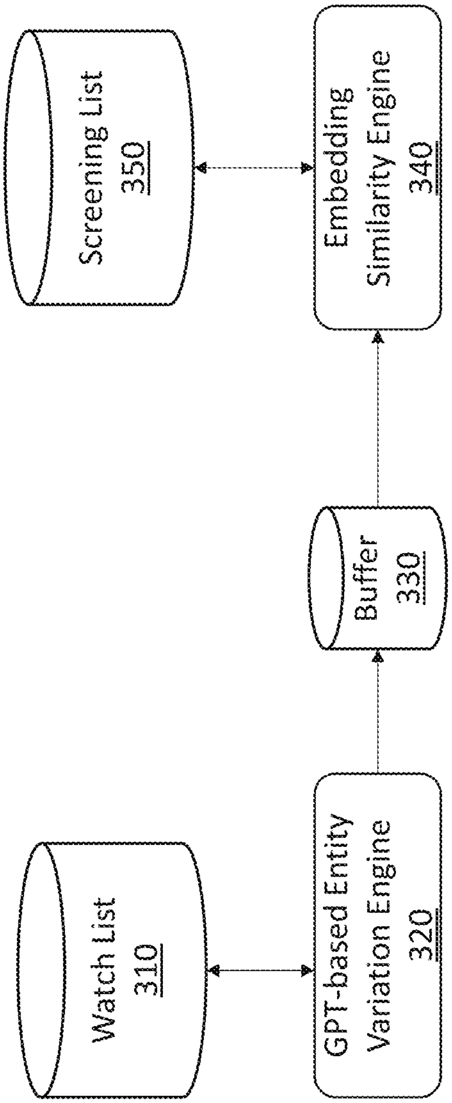
FIG. 3 is a system architecture diagram for automatically creating and using a watch list filter using generative artificial intelligence, according to some embodiments of the invention.

FIG. 3 is a system architecture diagram for automatically creating and using a watch list filter using generative artificial intelligence, according to some embodiments of the invention. The system architecture can include a watch list database 310, a screening list database 350, a GPT-based entity variation engine 320, a buffer 330, and an embedding similarity engine 340.

The watch list database 310 can be the watch list as described above with respect to FIG. 2. The GPT-based entity engine 320 can communicate with the watch list database 310 to retrieve the watch list entries and determine the variations. The GPT-based entity engine 320 can update the watch list database 310 with the variants.

The GPT-based entity engine 320 can transmit the watch list and the variants to the buffer 330. The buffer 330 can collect n entries, where n is an integer value and can be input by a user and/or based on the buffer size. The buffer 330 can transmit a group of watch list entries and their respective variants to the embedding similarity engine 340.

The embedding similarity engine 340 can determine similarity according to the method as described above in FIG. 2. The embedding similarity engine 340 can transmit also receive input from a screening list database 350. In some embodiments, the screening list database 350 can cause the embedding similarity engine 340 to add individuals who are under monitoring to assess their potential inclusion on the watch list to the watch list entity and variant list and determine similarity for screening entities, watch list entities and variants.

The system architecture of FIG. 3 and corresponding method of FIG. 2 can be implemented in any system that a semantic similarity with variants is needed. For example, the invention can be integrated into ACTIMIZE® to improve the watch list filter system by implementing an additional scoring method for entity matching.

Figure 4:
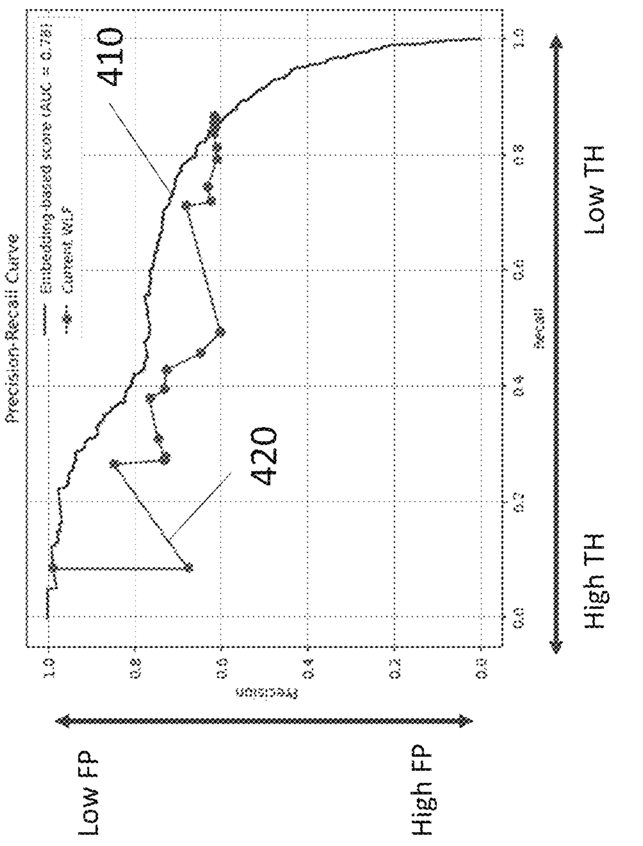
FIG. 4 is a precision-recall curve showing false positives for a method of current watch list filter vs. the method shown in the invention, according to some embodiments of the invention.

FIG. 4 is a precision-recall curve showing false positives for a method of current watch list filter vs. the method shown in the invention, according to some embodiments of the invention. In FIG. 4, the current watch list filter is IBM InfoSphere Global Name Recognition (GNR) for name matching. As shown, the current WLF 320 method has higher false positives and lower precision across higher hit rates compared to the method of the invention 410, where the hit rate is a number of true matches out of all potential hits.

The aforementioned flowcharts and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function (s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved, It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system or an apparatus. Accordingly, aspects of the present invention may take the form of an entirely hardware embodiment or an embodiment combining software and hardware aspects that may all generally be referred to herein as a "circuit," "module" or "system."

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

The invention claimed is:

1. A computerized-method for automatically creating and using a watch list using generative artificial intelligence, the computerized-method comprising:

receiving, by a computer, a watch list comprising a plurality of entities that are not allowed access to a sender's computing system, wherein the plurality of entities in the watchlist are strings;

dynamically generating, by the computer, a prompt for a machine learning model to generate a plurality of variants for each entity of the plurality of entities, wherein generating the prompt comprises automatically iterating through input data and dynamically inserting relevant entity information into the prompt for said each entity, wherein the prompt specifies constraints for generating the plurality of variants, the constraints including maintaining a same pattern as an original entity, preserving attribute names, and preserving attribute value types;

determining, by the computer, the plurality of variants for the plurality of entities using the machine learning model based on the dynamically generated prompt, wherein the plurality of variants are strings;

determining, by the computer, a first embedded array based on the watchlist, wherein the first embedded array are numerical values;

determining by the computer, a second embedded array based on the plurality of variants, wherein the second embedded array are numerical values;

adding, by the computer, all of the plurality of variants that have similarity with at least one watch list entity of the plurality of entities above a predetermined threshold to the watch list;

transmitting, by the computer, the watch list to the sender's computing system such that the sender's watch list is updated;

receiving, by the computer, a request for access to the sender's computing system, the request including an entity;

converting, by the computer, the entity to a numerical value;

adding, by the computer, the entity to the watch list and restricting access to the sender's computing system, if a similarity between the entity and any of the entities in the watch list is above a threshold; and allowing, by the computer, access to the sender's computing system, if the similarity is below the threshold.

2. The computerized-method of claim 1, wherein determining the first embedded array, the second embedded array, or both, further comprises employing a gtr-t5-base algorithm.

3. The computerized-method of claim 1, wherein the similarity is based on a cosine similarity score.

4. The computerized-method of claim 1, wherein the plurality of variants are determined using GPT.

5. The computerized-method of claim 4, wherein each variant of the plurality of variants is in a same pattern as its corresponding entity.

6. The computerized-method of claim 1, wherein the plurality of variants are a different ordering, abbreviation, misspelling, different formats, or any combination thereof of the plurality of entities.

7. The computerized-method of claim 1, wherein the sender's computing system is a computing system for access to banking.

8. A system for automatically creating and using a watch list using generative artificial intelligence, the system comprising:

a processor configured to:

receive a watch list comprising a plurality of entities that are not allowed access to a sender's computing system, wherein the plurality of entities in the watchlist are strings;

dynamically generate a prompt for a machine learning model to generate a plurality of variants for each entity of the plurality of entities, wherein the prompt is generated by automatically iterating through input data and dynamically inserting relevant entity information into the prompt for said each entity, wherein the prompt specifies constraints for generating the plurality of variants, the constraints including maintaining a same pattern as an original entity, preserving attribute names, and preserving attribute value types;

determine the plurality of variants for the plurality of entities using the machine learning model based on the dynamically generated prompt, wherein the plurality of variants are strings;

determine a first embedded array based on the watchlist, wherein the first embedded array are numerical values;

determine a second embedded array based on the plurality of variants, wherein the second embedded array are numerical values;

add all of the plurality of variants that have similarity with at least one watch list entity of the plurality of entities above a predetermined threshold to the watch list;

transmit the watch list to the sender's computing system such that the sender's watch list is updated;

receive a request for access to the sender's computing system, the request including an entity;

convert the entity to a numerical value;

add the entity to the watch list and restrict access to the sender's computing system, if a similarity between the entity and any of the entities in the watch list is above a threshold; and allow access to the sender's computing system, if the similarity is below the threshold.

9. The system of claim 8, wherein the first embedded array, the second embedded array, or both, are determined by employing a gtr-t5-base algorithm.

10. The system of claim 8, wherein the similarity is based on a cosine similarity score.

11. The system of claim 8, wherein the plurality of variants are determined using GPT.

12. The system of claim 11, wherein each variant of the plurality of variants is in a same pattern as its corresponding entity.

13. The system of claim 8, wherein the plurality of variants are a different ordering, abbreviation, misspelling, different formats, or any combination thereof of the plurality of entities.

14. The system of claim 8, wherein the sender's computing system is a computing system for access to banking.

15. A non-transitory computer program product comprising instructions which, when executed by a computer, cause the computer to:

receive a watch list comprising a plurality of entities that are not allowed access to a sender's computing system, wherein the plurality of entities in the watchlist are strings;

dynamically generate a prompt for a machine learning model to generate a plurality of variants for each entity of the plurality of entities, wherein the prompt is generated by automatically iterating through input data and dynamically inserting relevant entity information into the prompt for said each entity, wherein the prompt specifies constraints for generating the plurality of variants, the constraints including maintaining a same pattern as an original entity, preserving attribute names, and preserving attribute value types;

determine the plurality of variants for the plurality of entities using the machine learning model based on the dynamically generated prompt, wherein the plurality of variants are strings;

determine a first embedded array based on the watchlist, wherein the first embedded array are numerical values;

determine a second embedded array based on the plurality of variants, wherein the second embedded array are numerical values;

add all of the plurality of variants that have similarity with at least one watch list entity of the plurality of entities above a predetermined threshold to the watch list;

transmit the watch list to the sender's computing system such that the sender's watch list is updated;

receive a request for access to the sender's computing system, the request including an entity;

convert the entity to a numerical value;

add the entity to the watch list and restrict access to the sender's computing system, if a similarity between the entity and any of the entities in the watch list is above a threshold; and allow access to the sender's computing system, if the similarity is below the threshold.

16. The non-transitory computer program product of claim 15, wherein the first embedded array, the second embedded array, or both, are determined by employing a gtr-t5-base algorithm.

17. The non-transitory computer program product of claim 15, wherein the plurality of variants are determined using GPT.

* * * * *